US010787248B2

(12) United States Patent
Swank et al.

(10) Patent No.: US 10,787,248 B2
(45) Date of Patent: Sep. 29, 2020

(54) AXLE SADDLE

(71) Applicant: Goodrich Corporation, Charlotte, NC (US)

(72) Inventors: John Swank, Troy, OH (US); Shane E. Hunnicutt, Ludlow Falls, OH (US); Joshua Stephen Kossler, Troy, OH (US); Michael Neal Patterson, Laura, OH (US)

(73) Assignee: GOODRICH CORPORATION, Charlotte, NC (US)

(*) Notice: Subject to any disclaimer, the term of this patent is extended or adjusted under 35 U.S.C. 154(b) by 4 days.

(21) Appl. No.: 16/413,962

(22) Filed: May 16, 2019

(65) Prior Publication Data
US 2019/0270514 A1 Sep. 5, 2019

Related U.S. Application Data

(62) Division of application No. 14/874,098, filed on Oct. 2, 2015, now Pat. No. 10,329,011.

(51) Int. Cl.
B64F 5/00 (2017.01)
B64F 5/10 (2017.01)
B60B 27/00 (2006.01)
B64C 25/36 (2006.01)
B60B 35/02 (2006.01)

(52) U.S. Cl.
CPC ............ B64C 25/36 (2013.01); B60B 35/025 (2013.01); B64F 5/10 (2017.01); B60B 2340/00 (2013.01); B60B 2900/212 (2013.01)

(58) Field of Classification Search
CPC .......... B64C 25/36; B64F 5/10; B64F 5/0009; B60B 35/025; B60B 2340/00; B60B 2900/212; B60B 27/0094; B60B 2380/75
See application file for complete search history.

(56) References Cited

U.S. PATENT DOCUMENTS

| 2,435,048 A * | 1/1948 | McPherson ............. B64C 25/42 244/111 |
| 3,707,270 A * | 12/1972 | Laimins ................. G01G 19/07 244/103 R |
| 4,433,765 A | 2/1984 | Rude |
| 4,772,139 A | 9/1988 | Bretton |
| 5,020,832 A | 6/1991 | Coblentz |
| 5,360,241 A | 11/1994 | Gundy |
| 5,695,202 A * | 12/1997 | Cartwright ............... B62D 1/20 277/636 |
| 5,995,202 A | 11/1999 | Itoh |
| 6,109,635 A | 8/2000 | Maeda |

(Continued)

OTHER PUBLICATIONS

Extended European Search Report dated Jan. 30, 2017 in European Application No. 16191533.5.
(Continued)

Primary Examiner — Lawrence Averick
(74) Attorney, Agent, or Firm — Snell & Wilmer L.L.P.

(57) ABSTRACT

According to various embodiments, disclosed is an axle saddle system for an axle having an undercut between the outboard and inboard bearing lands of the axle. According to various embodiments, the axle saddle system comprises a saddle configured to fill the axle undercut in order to protect the axle from damage by the installation of a wheel onto the axle.

5 Claims, 5 Drawing Sheets

(56) References Cited

U.S. PATENT DOCUMENTS

| | | | |
|---|---|---|---|
| 6,139,027 A * | 10/2000 | Biekx | F16J 3/045 |
| | | | 277/631 |
| 6,412,803 B1 | 7/2002 | Lalikyan | |
| 6,685,592 B2 | 2/2004 | Fraczek | |
| 7,090,308 B2 | 5/2006 | Rose | |
| 7,409,749 B2 * | 8/2008 | Caveney | B65D 63/08 |
| | | | 24/21 |
| 7,607,837 B2 | 10/2009 | Niebling | |
| 9,688,391 B2 * | 6/2017 | Ganis | F16D 1/0805 |
| 2004/0036251 A1 | 2/2004 | Baldwin | |
| 2007/0031079 A1 | 2/2007 | Komori | |
| 2007/0160316 A1 | 7/2007 | Niebling | |
| 2010/0216557 A1 * | 8/2010 | Nakagawa | B60B 27/0042 |
| | | | 464/140 |
| 2012/0031516 A1 | 2/2012 | Yori, III et al. | |
| 2013/0049322 A1 | 2/2013 | Rose | |
| 2014/0265540 A1 | 9/2014 | Laird | |
| 2016/0236511 A1 | 8/2016 | Fakhoury | |
| 2016/0297516 A1 * | 10/2016 | Ganis | B60B 35/025 |
| 2017/0146068 A1 * | 5/2017 | O'Connell | F16C 35/063 |
| 2017/0203834 A1 | 7/2017 | Ganis | |
| 2018/0009479 A1 | 1/2018 | Merrill | |
| 2018/0127051 A1 | 5/2018 | Laird | |

OTHER PUBLICATIONS

USPTO; Restriction Requirement Office Action dated Oct. 19, 2017 in U.S. Appl. No. 14/874,098.

USPTO; Non-Final Office Action dated Oct. 5, 2018 in U.S. Appl. No. 14/874,098.

USPTO; Notice of Allowance dated Mar. 6, 2019 in U.S. Appl. No. 14/874,098.

Communication under Rule 71(3) EPC dated Jun. 5, 2018 in European Application No. 16191533.5.

* cited by examiner

AXLE SADDLE

CROSS REFERENCE TO RELATED APPLICATIONS

This application is a divisional of and claims priority to and the benefit of U.S. Ser. No. 14/874,098 filed Oct. 2, 2015 and entitled "AXLE SADDLE," which is hereby incorporated herein in its entirety for all purposes.

BACKGROUND

Aircraft axles may have an undercut between the bearing lands, e.g., for weight reduction or other design considerations. Assembly and installation or removal of a wheel assembly onto such an axle may subject the axle and bearing assembly to damage such as dislodging of the bearing assembly. Damage may occur, for example, as the bearing assembly tilts and impacts the axle undercut or bearing lands. This may lead to bearing failures, damaged wheels and/or lost wheels.

SUMMARY

In accordance with various embodiments, disclosed is an axle saddle system comprising: a saddle configured to substantially cover an undercut. of an axle over a surface area of the undercut; and at least one saddle strap configured to tighten the saddle around the undercut, wherein the axle comprises an outboard bearing land and an inboard bearing land, wherein the undercut is situated between the outboard bearing land and the inboard bearing land, wherein the undercut comprises an undercut perimeter and an undercut axial length, wherein the undercut is radially tapered with respect to at least one of the outboard bearing land and the inboard bearing land, and wherein the saddle is configured to substantially fill the undercut, such that the substantially filled undercut has a profile which is substantially level with the outboard bearing land and the inboard bearing land. In one embodiment, the saddle has a saddle axial length approximately equal to the undercut axial length. In one embodiment, the saddle comprises a strap channel, wherein the saddle strap is configured to nest within the strap channel. In one embodiment, the saddle strap comprises a buckle, and the saddle comprises a buckle cut out adjacent the strap channel, wherein the buckle is configured to nest within the buckle cut out. In one embodiment, the saddle comprises an outer surface, wherein the saddle strap and the buckle are substantially level with the outer surface when nested. In one embodiment, the axle saddle system comprises three saddle straps, and the saddle comprises three strap channels and three buckle cut outs. In one embodiment, the saddle strap is a stainless steel cable tie. In one embodiment, the saddle further comprises a moisture draining system. In one embodiment, the moisture draining system comprises a plurality of drain holes in the saddle. In one embodiment, the saddle comprises at least one of a cylindrical or a conical geometry. In one embodiment, the saddle has a saddle perimeter and an axial split along the saddle axial length, the axial split spanning between approximately 10° to 45° of the saddle perimeter. In one embodiment, the saddle may be deformed to an open position for insertion over the undercut. In one embodiment, the outboard bearing land and the inboard bearing land are each configured to receive a bearing assembly of an aircraft wheel. In one embodiment, the undercut is tapered with respect to both the outboard bearing land and the inboard bearing land.

In accordance with various embodiments, disclosed is an axle method comprising: inserting a saddle over an undercut of an axle, and tightening the saddle around the undercut, wherein the axle comprises an outboard bearing land and an inboard bearing land, wherein the undercut is situated between the outboard bearing land and the inboard bearing land and is radially tapered with respect to at least one of the outboard bearing land and the inboard bearing land, and wherein the saddle is configured to substantially fill the undercut over a surface area of the undercut, such that the substantially filled undercut is substantially level with the outboard bearing land and the inboard bearing land, wherein the undercut comprises an undercut perimeter and an undercut axial length forming the surface area of the undercut, and wherein the saddle has a saddle axial length approximately equal to the undercut axial length. In one embodiment, the axle method further comprises tightening the saddle around the undercut with at least one saddle strap. In one embodiment, the axle method further comprises prying the saddle open before inserting. In one embodiment, the saddle strap comprises a buckle and a strap end, the axle saddle method further comprising inserting the strap end through the buckle, pulling the strap end to tighten the saddle strap around the saddle, and breaking off an excess portion of the saddle strap.

In accordance with various embodiments, disclosed is an axle saddle system, comprising: a saddle configured to substantially cover an undercut of an axle over a surface area of the undercut, and a saddle strap configured to tighten the saddle around the undercut, wherein the undercut is situated between an outboard bearing land and an inboard bearing land of the axle, wherein the undercut is radially tapered with respect to the outboard bearing land and the inboard bearing land, wherein the undercut comprises an undercut perimeter and an undercut axial length forming the surface area of the undercut, wherein the saddle has a saddle axial length approximately equal to the undercut axial length, and a saddle perimeter configured to span at least 315 degrees of the undercut perimeter, wherein the saddle is configured to substantially fill the undercut, such that the substantially filled undercut has a profile which is substantially level with the outboard bearing land and the inboard bearing land, wherein the saddle comprises a strap channel, and wherein the saddle strap is configured to nest within the strap channel. In one embodiment, the saddle and saddle strap are metallic.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In accordance with various embodiments, disclosed is an axle saddle system 100 for an axle 101 having an undercut between the outboard and inboard bearing lands. The axle saddle system 100 comprises a saddle configured to fill the axle undercut in order to protect the axle 101 from damage by the installation of a wheel onto the axle.

Figure 1A:
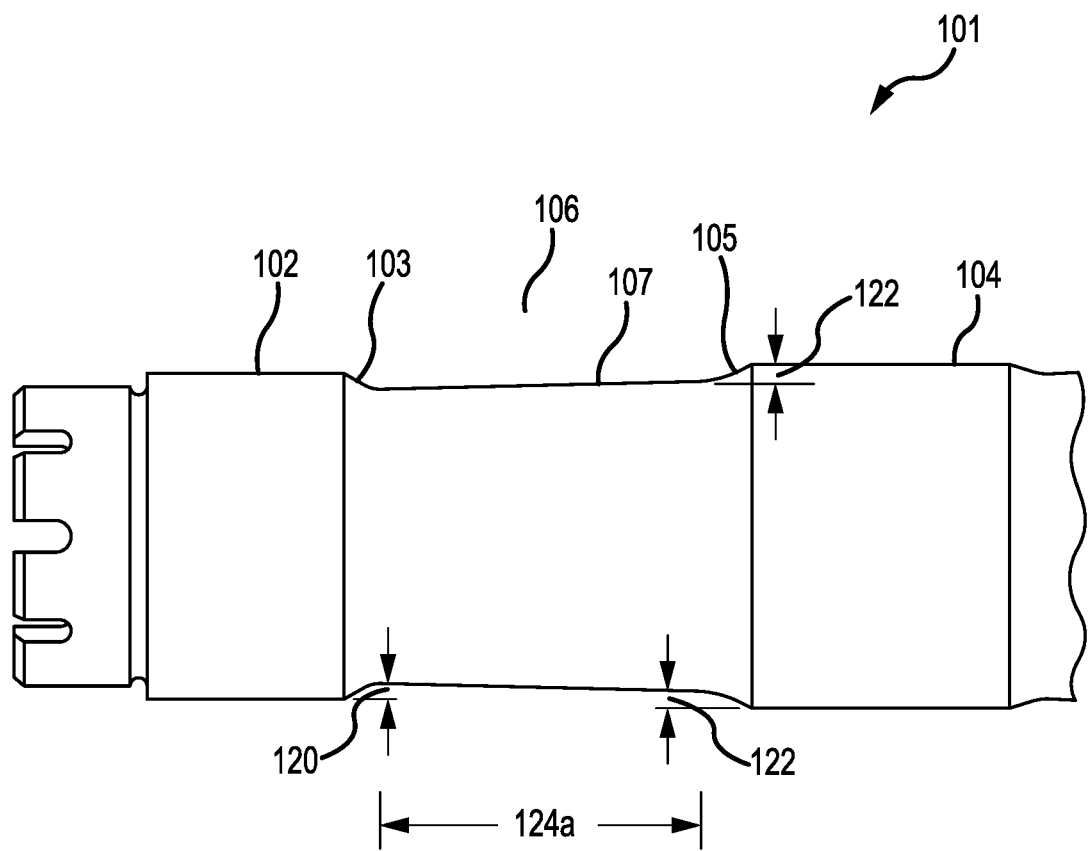
FIG. 1A is a partial view of an axle, which is a prior art axle for use with the saddle of the present invention.
Figure 1B:
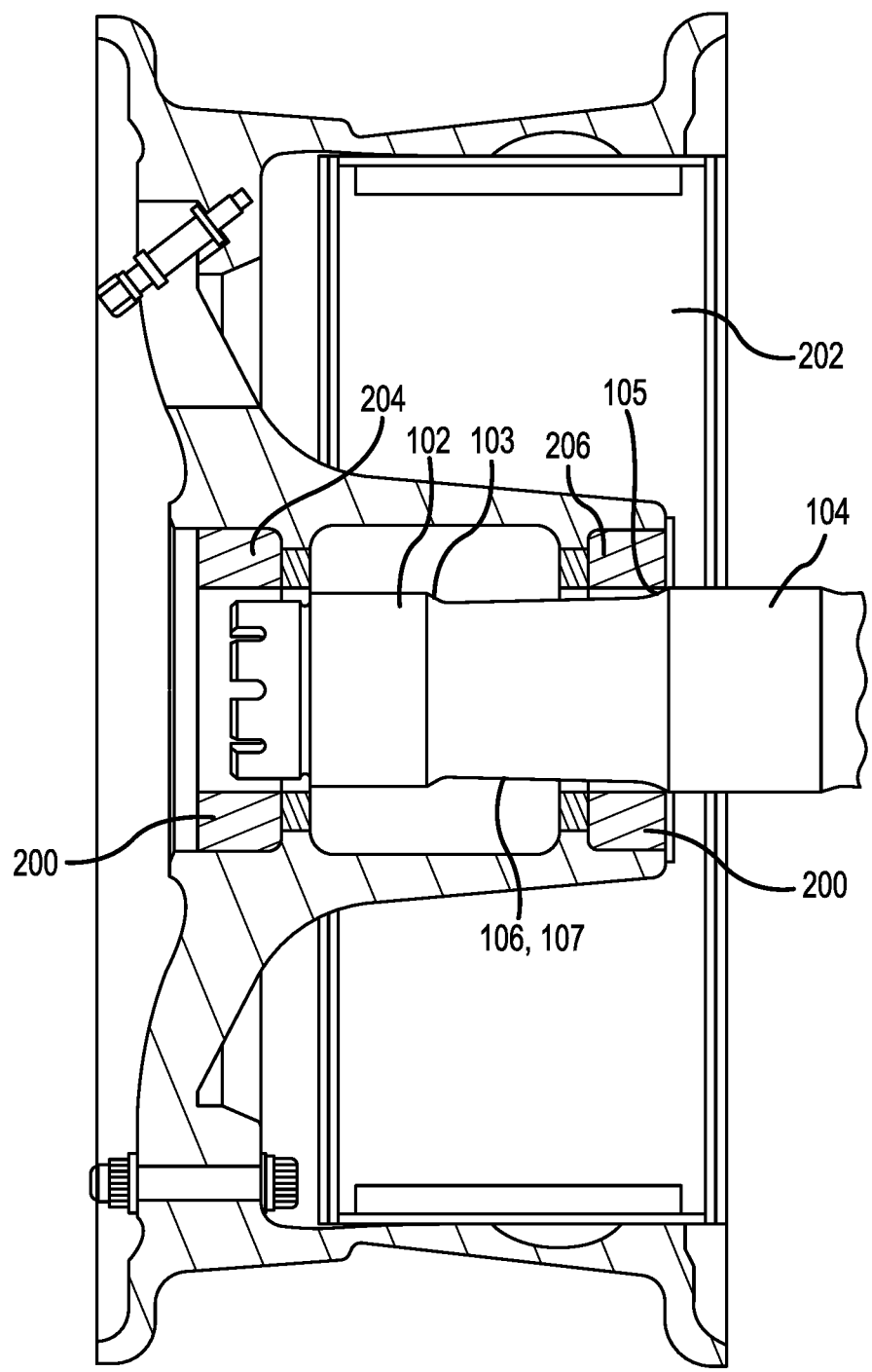
FIG. 1B shows interference between the inboard bearings of a wheel and an inboard transition wall of the axle of FIG. 1A.

According to various embodiments, and as shown in FIG. 1A, axle 101 may be a wheel axle, and may comprise an outboard bearing land 102, an inboard bearing land 104, and an axle shaft 106 between the outboard bearing land 102 and inboard bearing land 104. According to various embodiments, the outboard bearing land 102, and the inboard bearing land 104, are each configured to receive a bearing assembly 200 of a wheel 202 (e.g. an aircraft wheel), as shown in FIG. 1B. With reference to FIG. 1B, according to various embodiments, the bearing assembly 200 comprises an outboard bearing 204 configured to rotationally engage with the outboard bearing land 102, and an inboard bearing 206 configured to rotationally engage with the inboard bearing land 104. In various embodiments, outboard bearing 204, and inboard bearing 206, may comprising, for example, tapered roller bearings.

The axle shaft 106 is typically radially tapered with respect to at least one of the outboard bearing land 102 and inboard bearing land 104 to form an undercut axle shaft or axle undercut 107 between the outboard bearing land 102 and inboard bearing land 104. According to various embodiments, the axle undercut 107 may be tapered with respect to both the outboard bearing land 102, and inboard bearing land 104, with an outboard transition wall 103 between the outboard bearing land 102 and axle undercut 107, and an inboard transition wall 105 between the inboard bearing land 104 and axle undercut 107, as shown in FIGS. 1A and 1B. The outboard transition wall 103 spans radially outwards from the axle undercut 107 to the outboard bearing land 102, and the inboard transition wall 105 spans radially outwards from the axle undercut 107 to the outboard bearing land 102. The outboard transition wall 103, and the inboard transition wall 105 may each have various configurations, such as tapered, straight, etc., according to various embodiments. The axle undercut 107 can take on various configurations, such as conical, cylindrical, etc., according to various embodiments.

Due to the radial tapering of the axle undercut 107 with respect to the bearing lands, the inner diameter(s) of the outboard bearing 204 and inboard bearing 206 of bearing assembly 200, are typically both greater than the outer diameter(s) of the axle undercut 107, according to various embodiments. This may subject the axle 101 and bearing assembly 200 to damage, including dislodging of the bearing assembly 200, for example, during assembly, and/or removal of the wheel 202 and bearing assembly 200 (e.g. for repair, maintenance, etc.), and may make installation difficult, as the wheel may fail to translate smoothly over the bearing lands 102 and 104. Damage may occur, for example, as the bearing assembly 200 tilts and impacts against the axle undercut 107, exerts torque against one of the outboard bearing land 102 and/or inboard bearing land 104, impacts against one of the outboard transition wall 103 and/or inboard transition wall 105, etc. FIG. 1B shows a possible scenario wherein the inboard bearing 206 compacts against the inboard transition wall 105 of the inboard bearing land 104.

According to various embodiments, axle saddle system 100 is configured to substantially fill the axle undercut 107, to create an axle profile 107a, which is substantially flush or level with the outboard bearing land 102 and inboard bearing land 104. According to various embodiments, the outer diameter 108 of the filled axle shaft 106 may be slightly below the inner diameter(s) 108a of the bearing assembly 200. This may prevent damage to the axle 101 and bearing assembly 200, as described above, as the substantially filled axle undercut more closely conforms to the diameter(s) 108a of the bearing assembly 200.

Figure 2:
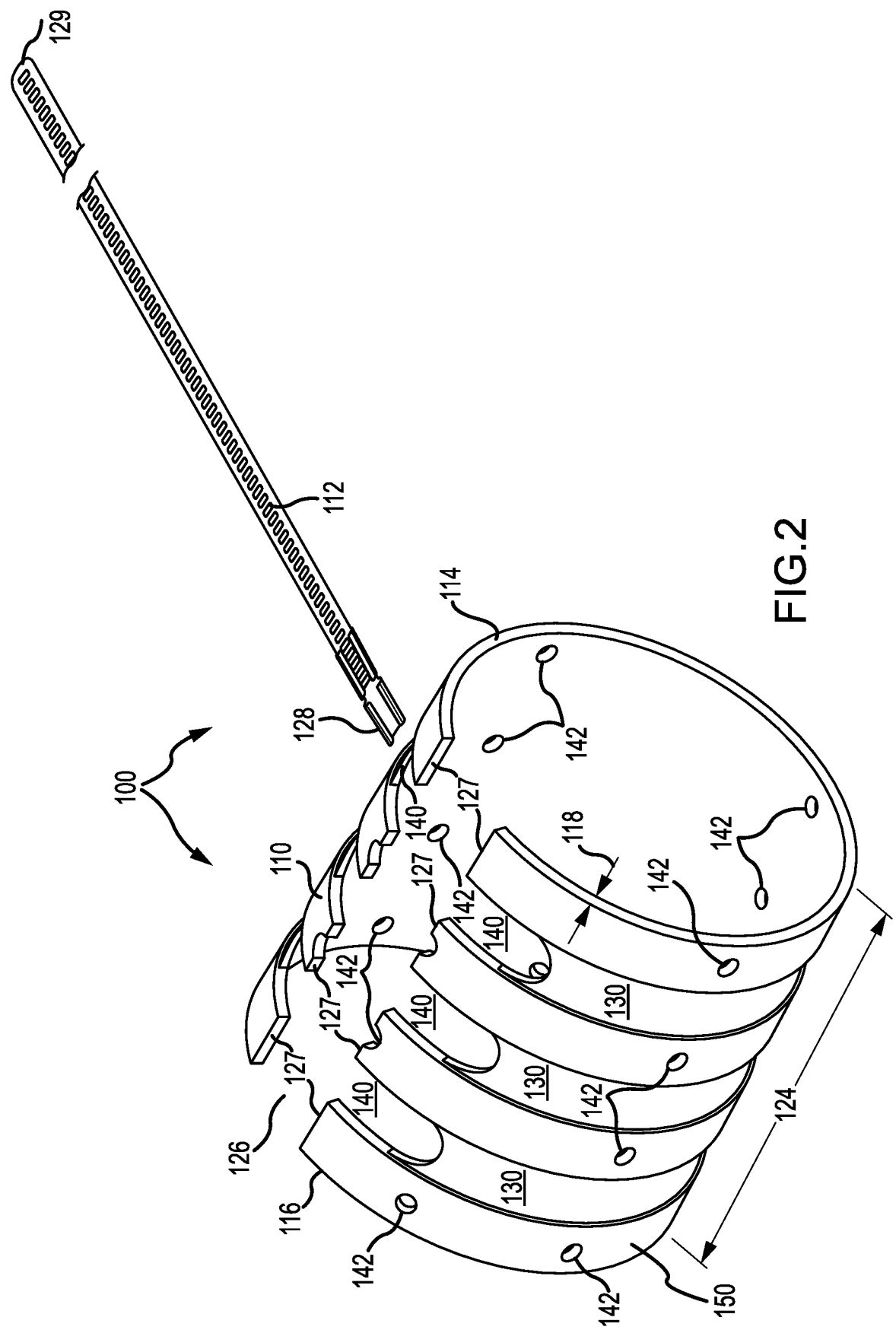
FIG. 2 is a perspective view of an axle saddle system comprising a saddle and at least one strap, according to various embodiments.
Figure 3:
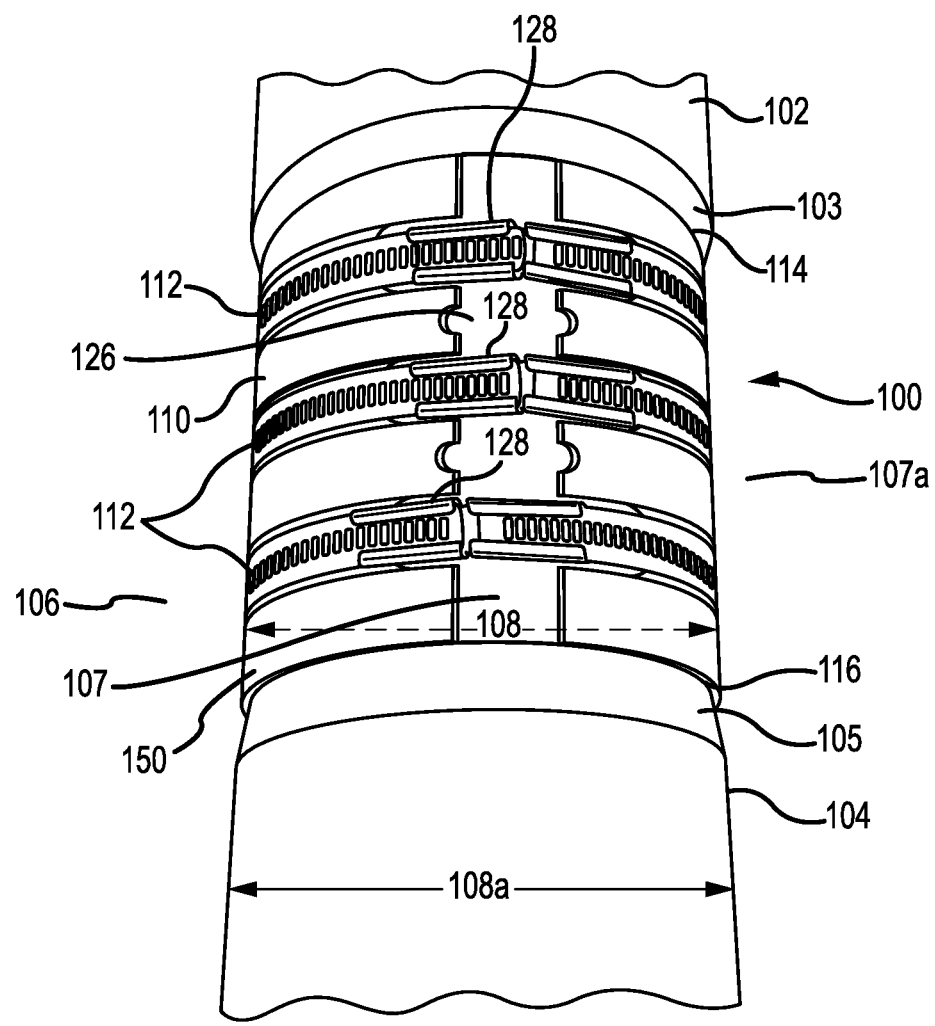
FIG. 3 shows the axle saddle system of FIG. 2 covering the axle of FIG. 1A.

According to various embodiments, the axle saddle system 100 comprises a saddle 110 and may comprise a saddle strap 112, as shown in FIG. 2.

According to various embodiments, the saddle 110 is configured to substantially cover the axle undercut 107 over its surface area, and to substantially fill the axle undercut 107, such that the substantially filled undercut has a profile 107a which is substantially level with the outboard bearing land 102 and the inboard bearing land 104.

According to various embodiments, saddle 110 is configured to conform to the geometry of the axle undercut 107. According to various embodiments, the axle undercut 107 has a circumferential perimeter, and may be cylindrical or conical (e.g., where the inboard bearing 206 has a larger diameter than the outboard bearing 204). According to various embodiments, the saddle 110 may have an axial length 124 approximately equal to the axial length 124a (see FIG. 1A) of the axle undercut 107. According to various embodiments, the saddle 110 may wrap around a majority portion of the circumferential perimeter of the axle undercut 107. According to various embodiments, the saddle 110 comprises a first saddle end 114 configured to abut the outboard transition wall 103, and a second saddle end 116 configured to abut the inboard transition wall 105. According to various embodiments, the saddle 110 may have a thickness 118 approximately equal to or slightly less than the radial span 120 (FIG. 1A) of the outboard transition wall 103 and/or radial span 122 (FIG. 1A) of the inboard transition wall 105. In various embodiments, radial span 120 may equal the radial span 122. In various embodiments, radial span 120 may not equal the radial span 122, and thickness 118 may gradually transition from a thickness approximately equal to or slightly less than radial span 120 at first saddle end 114, to a thickness approximately equal to or slightly less than radial span 122 at second saddle end 116, or thickness 118 may be approximately equal to or slightly less than the lesser of radial span 120 and radial span 122, according to various embodiments. According to various embodiments, saddle 110 may be formed from a metal such as stainless steel.

According to various embodiments, saddle 110 comprises an axial cut out portion or an axial split 126, along the axial length 124 of the saddle 110, for facilitating insertion of the saddle into the axle undercut 107. According to various embodiments, axial split 126 may span between approximately 10° to 45° of the circumference of the saddle 110. Thus, in describing the saddle 110 as configured to substantially cover the axle undercut 107 over its surface area, the term "substantially cover" may include a coverage spanning at least 315° of the perimeter of the surface area according to various embodiments. According to various embodiments, saddle 110 may be deformed to an open position for insertion by pulling apart the edges 127 of the axial split 126, enabling the saddle 110 to spread open, and slip over the axle undercut 107, then spring back into its natural shape. According to various embodiments, in the open position, saddle 110 may be deformed, such that axial split is approximately equal to the diameter 108a of the bearing assembly 200. According to various embodiments, axial split 126 of the saddle 110 in its natural shape may span approximately 45° of the perimeter of the surface area of the axle undercut 107.

According to various embodiments, saddle 110 of axle saddle system 100 is tightened around axle undercut 107 via saddle strap 112. According to various embodiments, saddle strap 112 comprises a buckle 128 and strap end 129. According to various embodiments, saddle strap 112 may be a band clamp or cable tie, or other similar closure device having low strap and buckle profiles. According to various embodiments the saddle strap 112 may be a stainless steel cable tie. Example of suitable saddle straps 112 having a low profile, flat head buckle (e.g. pawl and ratchet locking mechanism) may include various cable ties manufactured by Thomas and Betts and sold under the tradename TY RAP® or TY-MET®. According to various embodiments, saddle strap 112 may be installed by pulling the strap end 129 through buckle 128 to tighten its hold of the saddle 110 around the axle undercut 107. According to various embodiments, an excess end portion of saddle strap 112 may be broken off after tightening (e.g by twisting the end of the saddle strap 112, wherein saddle strap 112 is metallic).

According to various embodiments, saddle 110 comprises a strap channel 130 and a buckle cut out 140. According to various embodiments, saddle strap 112 is configured to nest within the strap channel 130, and buckle 128 is configured to nest within the buckle cut out 140 adjacent to the strap channel 130. According to various embodiments, strap channel 130 forms a circumferential recess in saddle 110, and the buckle cut out 140 is an extension of axial split 126, as shown in FIG. 2. According to various embodiments, the thickness of saddle strap 112 and buckle 128 are less than the thickness 118 of the saddle 110, such that saddle strap 112 and buckle 128, situated within strap channel 130 and buckle cut out 140, are flush and/or recessed with respect to an outer surface 150 of saddle 110.

According to various embodiments, axle saddle system 100 comprises two or more saddle straps 112, and saddle 110 comprises two or more strap channels 130. According to various embodiments, two or more strap channels 130 include adjacent buckle cut outs 140 for each strap channel 130, wherein the saddle straps 112 are configured to nest with strap channels 130. In various embodiments, the axle saddle system 100 comprises 3 saddle straps 112, and saddle 110 comprises 3 strap channels 130 and 3 buckle cut outs 140, for the saddle straps 112.

According to various embodiments, saddle 110 may further comprise a moisture draining system comprising drain holes 142 to prevent moisture (e.g., from condensation) from being trapped between the saddle 110 and axle undercut 107. According to various embodiments, the saddle 110 may comprise a plurality of spaced apart drain holes 142 throughout the saddle 110. In various embodiments, the saddle 110 includes 4 rows of 4 drain holes 142, for a total of 16 drain holes 142 as shown in FIG. 2.

According to various embodiments, the axle saddle system 100 may comprise any number of the strap channels 130 and the buckle cut outs 140, the drain holes 142, different types and/or number of the saddle straps 112, including embodiments without straps, and moisture drainage systems, etc. depending on design preferences, available materials, axle design, etc.

Figure 4:
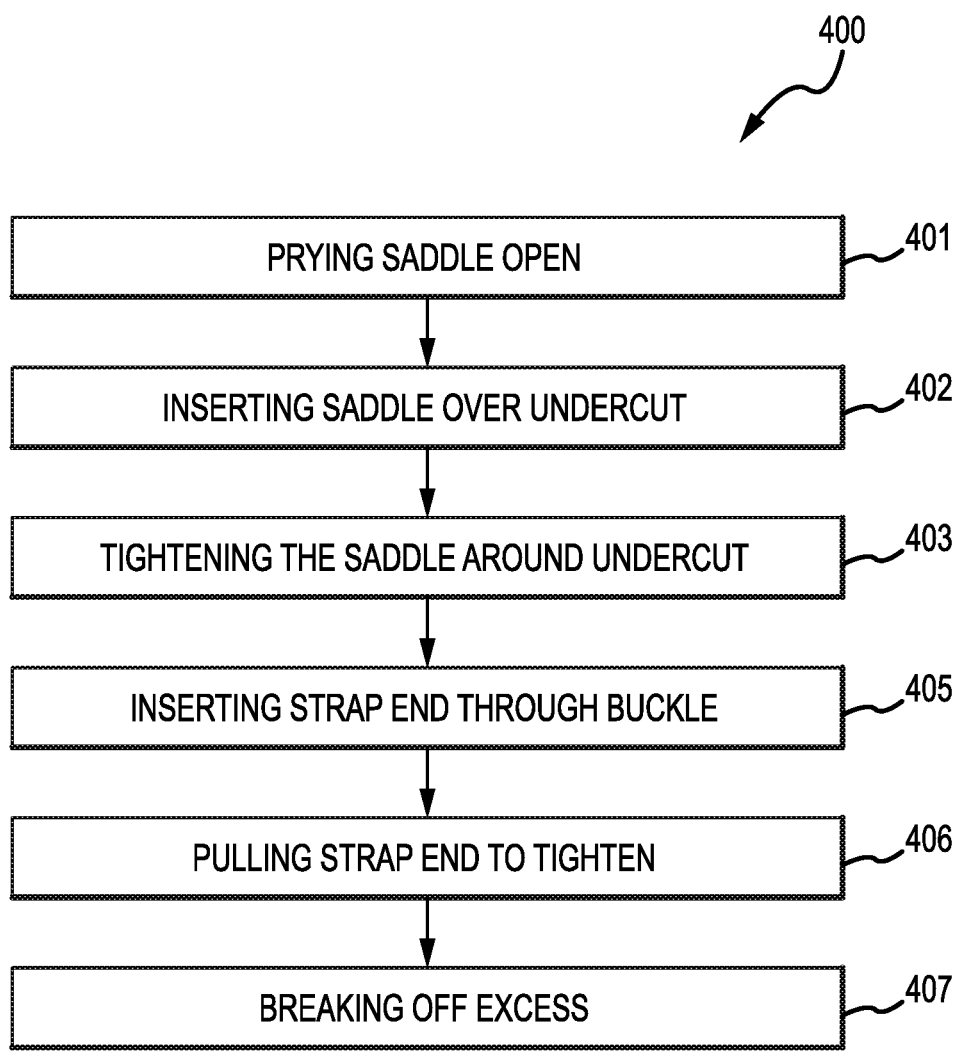
FIG. 4 is an axle method, according to various embodiments.

According to various embodiments, an axle method 400, shown in FIG. 4 comprises a first step of prying a saddle open (step 401), wherein the saddle comprises an axial split which enables the saddle to be deformed open. According to various embodiments, axle method 400 further comprises a next step of inserting the saddle over an undercut of a wheel axle (step 402). According to various embodiments, the wheel axle comprises an outboard bearing land and an inboard bearing land, wherein the undercut is situated between the outboard bearing land and the inboard bearing land and is tapered with respect to at least one of the outboard bearing land and the inboard bearing land. According to various embodiments, the saddle is configured to substantially fill the undercut, such that the substantially filled undercut is substantially level with the outboard bearing land and the inboard bearing land. According to various embodiments, axle method 400 further comprises a step of tightening the saddle around the undercut (step 403). According to various embodiments, at least one saddle strap may be used to tighten the saddle around the undercut for step 403. According to various embodiments, the saddle strap comprises a buckle and a strap end, the axle method 400 further comprising a step of inserting the strap end through the buckle (step 405), and a step of pulling the strap end through the buckle to tighten the strap around the saddle (step 406). According to various embodiments, axle method 400 may further comprise a step of breaking off an excess portion of the strap (step 407), which is the portion of the strap adjacent the strap end which was pulled through the buckle in step 406. According to various embodiments, the saddle may be left installed on the undercut, for example, after installation of a wheel. According to various embodiments, the saddle may be removed after the wheel has been installed.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An axle method, comprising:
inserting a saddle over an undercut of an axle; and
tightening the saddle around the undercut,
   wherein the axle comprises an outboard bearing land and an inboard bearing land,
   wherein the undercut is situated between the outboard bearing land and the inboard bearing land and is radially tapered with respect to at least one of the outboard bearing land and the inboard bearing land, and
   wherein the saddle is configured to substantially fill the undercut over a surface area of the undercut, such that the substantially filled undercut is substantially level with the outboard bearing land and the inboard bearing land, and
   wherein the undercut comprises an undercut perimeter and an undercut axial length forming the surface area of the undercut, and
   wherein the saddle has a saddle axial length approximately equal to the undercut axial length.

2. The axle method of claim 1, further comprising tightening the saddle around the undercut with a saddle strap.

3. The axle method of claim 2, further comprising deforming the saddle open before inserting the saddle over the undercut.

4. The axle method of claim 2, wherein the saddle strap comprises a buckle and a strap end.

5. The axle method of claim 4, further comprising:
inserting the strap end through the buckle;
pulling the strap end to tighten the saddle strap around the saddle; and
breaking off an excess portion of the saddle strap.

* * * * *